United States Patent [19]

Kudoh

[11] Patent Number: 5,148,160
[45] Date of Patent: Sep. 15, 1992

[54] RADIO COMMUNICATION APPARATUS FOR RAPIDLY KNOWING WHETHER THE APPARATUS IS WITHIN OR OUT OF A SERVICE AREA

[75] Inventor: Kazuhiro Kudoh, Tokyo, Japan

[73] Assignee: NEC Corporation, Tokyo, Japan

[21] Appl. No.: 553,844

[22] Filed: Jul. 18, 1990

[30] Foreign Application Priority Data

Jul. 18, 1989 [JP] Japan .................................. 1-184915

[51] Int. Cl.⁵ ............................................. H04B 7/00
[52] U.S. Cl. ............................. 340/825.44; 340/311.1
[58] Field of Search ...................... 340/825.44, 825.47, 340/825.48, 311.1; 455/33, 34, 38, 53, 54, 343; 379/54, 57, 59

[56] References Cited

U.S. PATENT DOCUMENTS

| | | | |
|---|---|---|---|
| 4,916,728 | 4/1990 | Blair | 455/33 |
| 4,996,715 | 2/1991 | Marui et al. | 455/33 |
| 5,049,875 | 9/1991 | DeLuca et al. | 340/825.44 |

Primary Examiner—Donald J. Yusko
Assistant Examiner—Dervis Magistre
Attorney, Agent, or Firm—Sughrue, Mion, Zinn, Macpeak & Seas

[57] ABSTRACT

A radio communication apparatus for receiving radio signals at a predetermined period when a power source switch is put in an on state and when the apparatus is in a service area of a base station. A timer circuit times a preselected time interval, substantially equal to the predetermined period, beginning at a time instant at which the switch is turned from an off state to the on state and produces a time-out signal after the preselected time interval has elapsed. Each radio signal carries a synchronization signal and an additional signal. A detecting circuit detects a timing at which a synchronizing circuit is in a synchronized state wherein a timing clock signal produced by a clock generating circuit is synchronized with the synchronization signal. The detecting circuit produces a detection signal when the detecting circuit detects the timing before reception of the time-out signal. When the detecting circuit does not detect the timing before reception of the time-out signal, the detecting circuit produces the time-out signal as a non-detection signal. An announcing arrangement announces in response to the detection signal and the non-detection signal whether or not the apparatus is in the synchronized state.

4 Claims, 4 Drawing Sheets

RADIO COMMUNICATION APPARATUS FOR RAPIDLY KNOWING WHETHER THE APPARATUS IS WITHIN OR OUT OF A SERVICE AREA

BACKGROUND OF THE INVENTION

This invention relates to a radio communication apparatus for receiving radio signals at a predetermined period. The radio communication apparatus may be a radio paging receiver, a transceiver, or the like although description will be mainly made in connection with a radio paging receiver.

A radio paging receiver of the type described, receives radio signals when supplied with an electric power from a power source. Each of the radio signals carries a synchronization signal and an additional signal which succeeds the synchronization signal and will become clear as the description proceeds. The radio signals are periodically transmitted by a base station which has a service area within which the paging receiver can receive the radio signals.

The radio paging receiver comprises a power source switch which has an on state and an off state and is connected to the power source. Connected to the power source switch, a first processing circuit processes each of the radio signals into the synchronization and the additional signals when the power source switch is in the on state. It should be understood that the first processing circuit is supplied with the electric power when the switch is in the on state and that the supply of the electric power is associated with the power source switch being in the on state.

Connected to the power source switch, a clock generating circuit generates a timing clock signal when the power source, switch is in the on state. Connected to the power source switch and the first processing and the clock generating circuits, a synchronizing circuit synchronizes the timing clock signal with the synchronization signal as a synchronized clock signal when the power source switch is in the on state.

Connected to the power source switch and the first processing and the synchronizing circuits, a second processing circuit processes the additional signal into a processed signal by using the synchronized clock signal when the power source switch is in the on state. That is, the second processing circuit is capable of dealing with or responding to the additional signal when the paging receiver is put in a synchronized state in which the timing clock signal serves as the synchronized clock signal. Operation of the second processing circuit will be described below in more detail.

When a possessor of the paging receiver turns the power source switch from the off state to the on state, the possessor wishes to know, as soon as possible, whether or not the paging receiver is put in the synchronized state and whether or not the paging receiver is present in the service area. From this viewpoint, it is desirable to make the paging receiver rapidly announce whether or not it is present in the service area immediately after the power source switch is turned from the off state to the on state.

SUMMARY OF THE INVENTION

It is therefore an object of this invention to provide a radio communication apparatus which is capable of rapidly announcing whether or not the apparatus is put in the synchronized state immediately after a power source switch is turned from an off state to an on state.

It is another object of this invention to provide a radio communication apparatus of the type described, which is capable of rapidly announcing whether the apparatus is within or out of a service area of a base station immediately after the power source switch is turned from the off state to the on state.

Other objects of this invention will become clear as the description proceeds.

On describing the aspect of this invention, it is possible to understand that a radio communication apparatus is for receiving radio signals at a predetermined period when supplied with an electric power from a power source. Each of the radio signals carries a synchronization signal and an additional signal succeeding the synchronization signal. The apparatus includes a switch having an on state and an off state and connected to the power source, first processing means connected to the switch for processing each of the radio signals into the synchronization and the additional signals when the switch is put in the on state, clock generating means connected to the switch for generating a timing clock signal when the switch is put in the on state, synchronizing means connected to the switch and the first processing and the clock generating means for synchronizing the timing clock signal with the synchronization signal as a synchronized clock signal when the switch is put in the on state, and second processing means connected to the switch and the first processing and the synchronizing means for processing the additional signal into a processed signal by using the synchronized clock signal when the switch is put in the on state.

According to this aspect of the invention, the above-understood radio communication apparatus comprises (1) timer means connected to the switch for timing a preselected time interval substantially equal to the predetermined period from a time instant at which the switch is turned from the off state to the on state, the timer means producing a time-out signal when the timer means times the preselected interval, (2) detecting means connected to the switch and the synchronizing and the timer means for detecting, when the switch is put in the on state, a timing at which the timing clock signal becomes the synchronized clock signal, the detecting means producing a detection signal when the detecting means detects the timing before reception of the time-out signal, the detecting means producing, when the detecting means does not detect the timing before reception of the time-out signal, the time-out signal as a non-detection signal, and (3) announcing means connected to the switch and the detecting means for announcing, in response to the detection signal and the non-detection signal when the switch is put in the on state, that the apparatus is or is not in a synchronized state.

On describing a different aspect of this invention, it is possible to understand that a radio communication apparatus is for receiving radio signals at a predetermined period when supplied with an electric power from a power source and when put in a service area of a base station. Each of the radio signals carries a synchronization signal and an additional signal succeeding said synchronization signal. The apparatus includes a switch having an on state and an off state and connected to the power source, first processing means connected to the switch for processing each of the radio signals into the synchronization and the additional signals when the switch is put in the on state, clock generating means connected to the switch for generating a timing clock signal when the switch is put in the on state, synchronizing means connected to the switch and the first processing and the clock generating means for synchronizing the timing clock signal with the synchronization signal as a synchronized clock signal when the switch is put in the on state, and second processing means connected to the switch and the first processing and the synchronizing means for processing the additional signal into a processed signal by using the synchronized clock signal when the switch is put in the on state.

According to this aspect of this invention, the above-understood radio communication apparatus comprises (1) timer means connected to the switch for timing a preselected time interval substantially equal to the predetermined period from a time instant at which the switch is turned from the off state to the on state, the timer means producing a time-out signal when the timer means times the preselected time interval, (2) detecting means connected to the switch and the synchronizing and the timer means for detecting, when the switch is put in the on state, a timing at which the timing clock signal becomes the synchronized clock signal, the detecting means producing a detection signal when the detecting means detects the timing before reception of the time-out signal, the detecting means producing, when the detecting means does not detect the timing before reception of the time-out signal, the time-out signal as a non-detection signal, and (3) announcing means connected to the switch and the detecting means for announcing, in response to the detection signal and the non-detection signal when the switch is put in the on state, that the apparatus is and is not present in the service area, respectively.

DESCRIPTION OF THE PREFERRED EMBODIMENT

Figure 1:
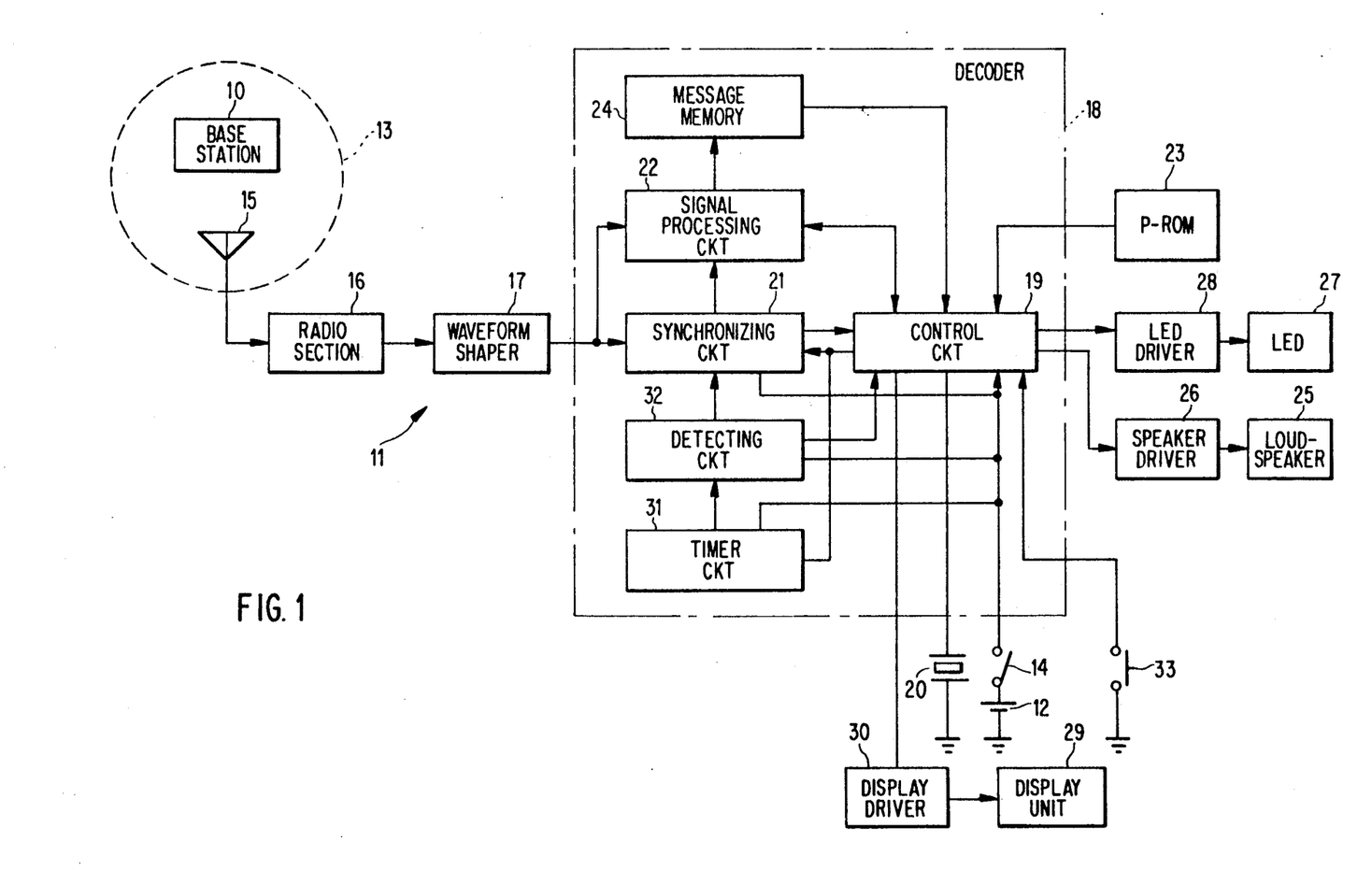
FIG. 1 is a block diagram of a radio paging system which comprises a radio paging receiver according to a preferred embodiment of this invention.

Referring to FIG. 1, a radio paging system comprises a base station 10, a radio paging receiver 11 according to a preferred embodiment of this invention, and other radio paging receiver (not illustrated) which are similar in structure and in operation to the radio paging receiver 11. The radio paging receiver 11 is for receiving radio signals when supplied with electric power from a battery 12 which serves as a power source. The radio signals are transmitted by the base station 10 which has a service area 13. When the paging receiver 11 is present within the service area 13, the paging receiver 11 can receive the radio signals.

Figure 2:
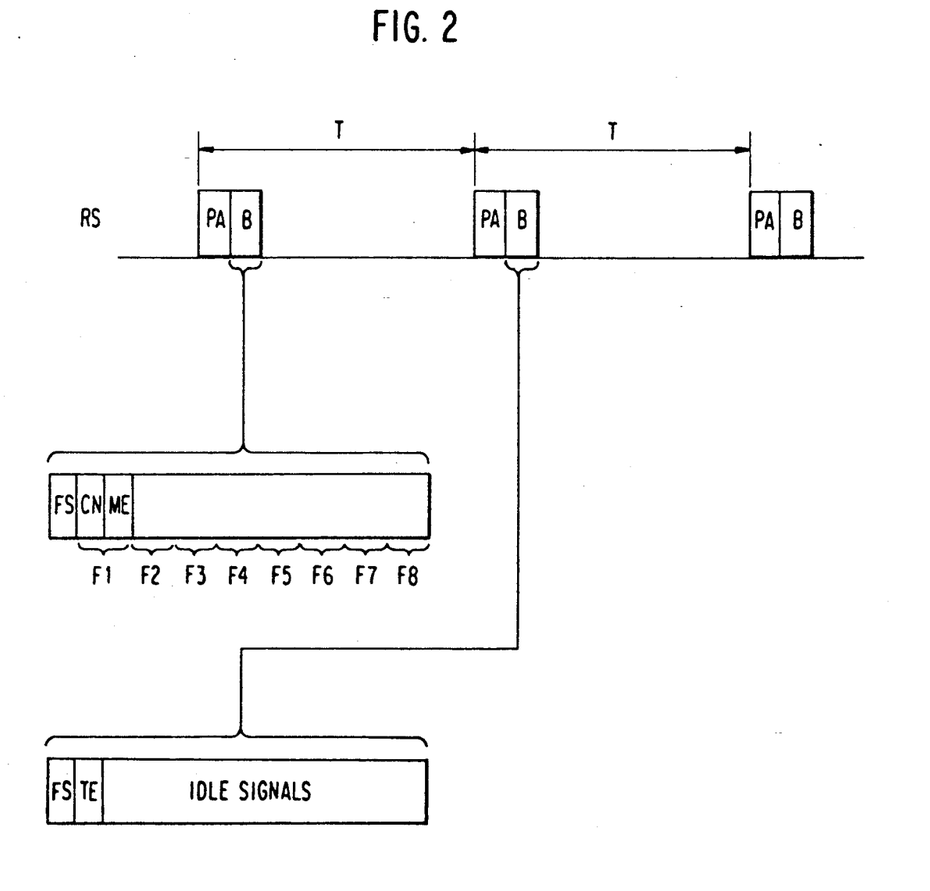
FIG. 2 is a signal format for use in describing operation of the radio paging system illustrated in FIG. 1.

Turning to FIG. 2, the radio signals are indicated at RS along a top or first line. Each of the illustrated radio signals RS is POGSAG cod radio signal which is set up in CCIR recommendation 584. The radio signals RS are transmitted by the base station 10 (FIG. 1) at a predetermined period T of, for example, two minutes. In short, the radio signals RS are intermittently transmitted.

Each of the radio signals RS carries a preamble signal PA and a batch B which succeeds the preamble signal PA. Each of the preamble signals PA has, for example, an eighteen-codeword length when a unit codeword consists of, for example, 32 bits. Each of the preamble signals PA is specified by a repetition of pulses which are of logic "1" and "0" levels. Each of the batches B consists of, for example, seventeen codewords. Other batches may succeed the illustrated batch B within the predetermined period T in which only one combination of the preamble signal PA and the batch B is depicted.

As depicted along a second line, the illustrated batch B comprises a frame synchronization signal PS and first through eighth frames F1 to F8. The frame synchronization signal FS succeeds the preamble signal PA. The frame synchronization signal FS has, for example, a one-codeword length and is specified by a predetermined pattern of bits. The first through the eighth frames F1 to F8 successively succeed the synchronization signal FS. Each of the frames F1 to F8 has a two-codeword length.

The radio paging receiver 11 and other radio paging receivers of the radio paging system have call numbers different from one another and may be grouped into first through eighth groups. The first through the eighth groups are assigned to the first through the eighth frames F1 to F8 of each batch B, respectively. Supposing that the radio paging receiver 11 belongs to the first group, the base station 10 transmits a call number signal CN representative of the radio paging receiver 11 and a message signal ME representative of a message directed to the paging receiver 11 by using the first frame F1 in the manner illustrated along the second line. Each of the call number signal CN and the message signal ME has a one-codeword length. When it is unnecessary to transmit the call number signal CN and the message signal ME, the base station 10 transmits an idle signal of a one-codeword length instead of each of the call number signal CN and the message signal ME.

It will be assumed that the base station 10 has no call number signal which should be transmitted when a time duration substantially equal to the predetermined period T lapses after transmission of a preceding radio signal RS. In this case, the base station 10 transmits a batch B comprising the frame synchronization signal FS and a test call number signal TE representative of a test call number as depicted along a third line. The test call number signal TE succeeds the frame synchronization signal FS and has a one-codeword length. The test call number is for use in testing a test paging receiver which is carried for a calling test by a maintenance engineer who is in charge of maintenance service of the radio paging system. Idle signals follow the test call number signal TE and has a total length of fifteen codewords. Each of the frame synchronization signal, the call number signal CN, the message signal ME, the idle signal, and test call number signal TE consists of Bose-Chaudhuri-Hocquenghem (BCH) codes.

In each of the radio signals RS, a combination of the preamble signal PA and the frame synchronization signal FS is referred to herein as a synchronization signal.

Either another combination of the call number signal CN and the message signal ME or the test call number signal TE is referred to as an additional signal which succeeds the synchronization signal.

Turning back to FIG. 1 with reference to FIG. 2 continued, the radio paging receiver 11 comprises a power source switch 14 having an on state and an off state. The power source switch 14 is connected to the power source 12.

The radio signals RS are picked up by an antenna 15 and supplied to a radio section 16. The radio section 16 is connected to the power source switch 14 in a manner known in the art. When the power source switch 14 is put in the on state to supply the electric power to the radio section 16, the radio section 16 converts or demodulates each of the radio signals into a baseband or demodulated signal. The domodulated signal is supplied to a waveform shaper 17. The waveform shaper 17 is also connected to the power source switch 14 in a known manner. When supplied with the electric power through the power source switch 14, the waveform shaper 17 shapes the demodulated signal into a shaped signal of a digital waveform. The shaped signal comprises the synchronization signal (namely, a combination of the preamble signal PA and the frame synchronization signal FS) and the additional signal (namely, either another combination of the call number signal CN and the message signal ME or the test call number signal TE).

Thus, a combination of the radio section 16 and the waveform shaper 17 serves as a first processing circuit connected to the power source switch 14. The first processing circuit processes each of the radio signals RS into the synchronization signal and the additional signal when the power source switch 14 is put in the on state. In short, the first processing circuit processes each of the radio signals to reproduce the synchronization signal and the additional signal.

The shaped signal is supplied to a decoder 18. The decoder 18 may be implemented by a one-chip central processing unit (CPU). The decoder 18 comprises a control circuit 19 connected to the power source switch 14. When supplied with the electric power, the control circuit 19 cooperates with a quartz crystal oscillator 20 to generate a timing clock signal which has a frequency determined by a natural frequency of the quarts crystal oscillator 20 and can be synchronized with the preamble signal in the manner presently described. Thus, a combination of the control circuit 19 and the quartz crystal oscillator 20 is operable as a clock generating circuit connected to the power source switch 14. The clock generating circuit generates the timing clock signal when the power source switch 14 is put in the on state.

A synchronizing circuit 21 is connected to the power source swith 14, the waveform shaper 17, and the control circuit 19. When supplied with electric power, the synchronizing circuit 21 synchronizes the timing clock signal with the preamble signal PA as a synchronized clock signal (namely, a synchronized signal) in order to establish bit synchronization. The synchronizing circuit 21 can establish the bit synchronization when the synchronizing circuit 21 receives the preamble signal PA of at least one-codeword length. Thereafter, the synchronizing circuit 21 detects the frame synchronization signal PS in order to establish frame sychronizaton. When the frame synchronization signal FS is detected, the synchronizing circuit 21 delivers a read request signal and the synchronized clock signal to the control circuit 19 and delivers the synchronized clock signal to a signal processing circuit 22.

Responsive to the read request signal, the control circuit 19 cooperates with a P-ROM (programmable read-only memory) 23 which preliminarily memorizes a directory number signal indicative of a directory number assigned to the paging receiver 11. That is, the control circuit 19 reads the directory number signal out of the P-ROM 23 in response to the read request signal and the sychronized clock signal and delivers the directory number signal to the signal processing circuit 22.

The signal processing circuit 22 is connected to the power source swith 14 in a known manner, to the waveform shaper 17, and to the synchronizing circuit 21 to operate in the following manner when supplied with the electric power through the power source switch 14. The signal processing circuit 22 is supplied with the synchronized clock signal and receives the additional signal from the waveform shaper 17 and the directory number signal from the control circuit 19. As mentioned above, the additional signal succeeds the frame synchronization signal FS and is either the test call number signal TE or a combination of the call number signal CN and the message signal ME. Although operation of the signal processing circuit 22 will now be described only in connection with a case where the signal processing circuit 22 receives the combination of the call number signal CN and the message signal ME as the additional signal from the waveform shaper 17, similar operation is carried out in the signal processing circuit 22 in another case where the signal processing circuit 22 receives the test call number signal TE as the additonal signal.

Responsive to the call number signal CN and the directory number signal, the signal processing circuit 22 compares the call number signal CN with the directory number signal bit by bit by using the synchronized clock signal supplied from the synchronizing circuit 21. When the signal processing circuit 22 detects coincidence between bits of the call number signal CN and the directory number signal, the signal processing circuit 22 stores in a message memory 24 the message signal ME which succeeds the call number signal CN.

The message memory 24 may be an RAM (random access memory). The message memory 24 is connected to the power source switch 14 in a known manner and memorizes the message signal ME when supplied with the electric power through the power source switch 14. When a storing operation of the message signal ME in the message memory 24 comes to an end, the signal processing circuit 22 sends an end signal to the control circuit 19.

Responsive to the end signal, the control circuit 19 produces a first speaker drive signal and a first diode drive signal. The control circuit 19 sends the first speaker drive signal to a loudspeaker 25 through a speaker driver 26 to make the loudspeaker 25 generate a first or call tone indicative of arrival of a call to the paging receiver 11 for a first predetermined time duration. The control circuit 19 sends the first diode drive signal to an LED (light-emitting diode) 27 through an LED driver 28 to make the LED 27 generate a first flicker light indicative of arrival of the call to the paging receiver 11 for the first predetermined time duration.

Responsive to the end signal, the control circuit 19 reads the message signal ME out of the message memory 24 and sends the message signal ME to a display unit 29 through a display driver 30 to make the display unit 29 visually display the message of the message signal ME. The display unit 29 is, for example, a liquid crystal display (LCD). Each of the loudspeaker 25, the speaker driver 26, the LED 27, the LED driver 28, the display unit 29, and the display driver 30 operates in the described manner when supplied with the electric power through the power source switch 14.

Thus, the signal processing circuit 22 serves, in cooperation with the control circuit 19, the P-ROM 23, and the message memory 24, as a second processing circuit which is connected to the power source switch 14, the first processing circuit (namely, the combination of the radio section 16 and the waveform shaper 17), and the synchronizing circuit 21. The second processing circuit processes the additional signal into a processed signal (namely, the end signal, the first speaker drive signal, and the first diode drive signal) by using the synchronized clock signal when the power source switch 14 is put in the on state.

In FIG. 1, a timer circuit 31 is connected to the power source switch 14. The illustrated timer circuit 31 is a clock counter which counts successive clocks of the timing clock signal when supplied with the electric power through the power source switch 14. The timer circuit 31 times a preselected time interval substantially equal to the predetermined period T (FIG. 2) from a time instant at which the power source switch 14 is turned from the off state to the on state. The timer circuit 31 produces a time-out signal when the timer circuit 31 times the preselected time interval.

A detecting circuit 32 is connected to the power source switch 14 and the synchronizing circuit 21. When supplied with electric power through the power source switch 14 the detecting circuit 32 detects a timing at which the timing clock signal becomes the synchronized clock signal. More specifically, the detecting circuit 32 detects, as the timing, a specific time instant at which the synchronizing circuit 21 detects the frame synchronization signal. The detecting circuit 32 produces a detection signal when the detecting circuit 32 detects the timing before reception of the time-out signal. When the detecting circuit 32 does not detect the timing before reception of the time-out signal, the detecting circuit 32 produces the time-out signal as a non-detection signal.

Responsive to the detection signal, the control circuit 19 produces a second speaker driver signal and a second diode drive signal. The control circuit 19 sends the second speaker drive signal to the loudspeaker 25 through the speaker driver 26 to make the loudspeaker 25 generate a second tone announcing that the synchronizing circuit 21 of the paging receiver 11 is in a synchronized state and that the paging receiver 11 is present in the service area. The second tone is generated for a second predetermined time duration of, for example, two seconds. The control circuit 19 sends the second diode drive signals to the LED 27 through the LED drive 28 to make the LED 27 generate a second flicker light announcing that the synchronizing circuit 21 of the paging receiver 11 is in the synchronized state and that the paging receiver 11 is present in the service area 13. The second flicker light is generated for the second predetermined time duration.

Responsive to the non-detection signal, the control circuit 19 produces a third speaker drive signal and a third diode drive signal. In this case, the control circuit 19 sends the third speaker drive signal to the loudspeaker 25 to make the loudspeaker 25 generate a third tone announcing that the synchronizing circuit 21 of the paging receiver 11 is not in the synchronized state and that the paging receiver 11 is not present in the service area 13. The third tone is generated for a third predetermined time duration of, for example, two seconds. Likewise, the control circuit 19 sends the third diode drive signal to the LED 27 to make the LED 27 generate a third flicker light announcing that the synchronizing circuit 21 of the paging receiver 11 is not in the synchronized state and that the paging receiver 11 is not present in the service area 13. The third flicker light is generated for the third predetermined time duration.

Thus, the control circuit 19 serves, in cooperation with the loudspeaker 25, the speaker driver 26, the LED 27, and the LED driver 28, as an announcing or annunciating arrangement which is connected to the power source switch 14 and the detecting circuit 32. When the power source switch 14 is put in the on state, the announcing arrangement distinctively announces in response to the detection signal and the non-detection signal that the paging receiver 11 is or is not in the synchronized state (namely, whether the paging receiver 11 is present in the service area 13), respectively.

Figure 3:
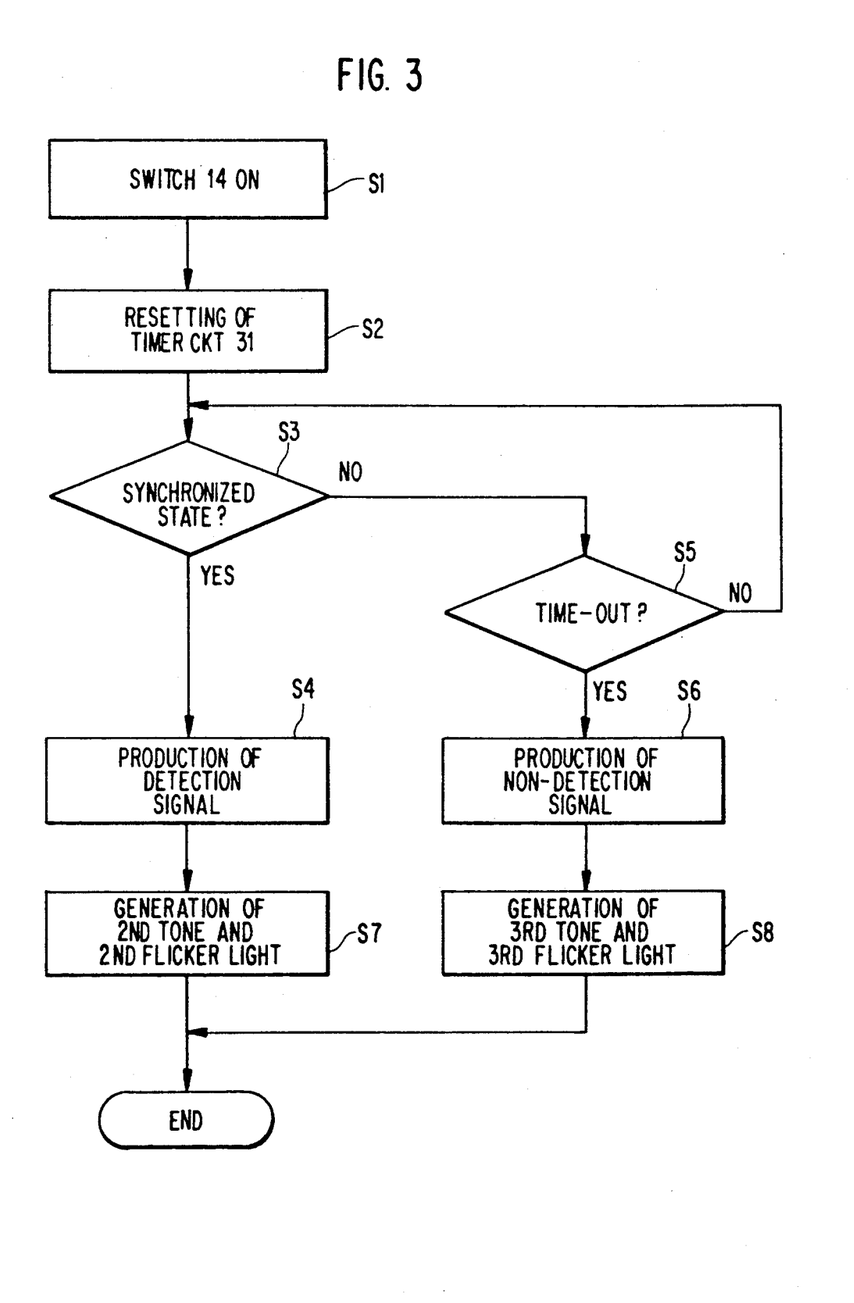
FIG. 3 is a flow chart illustrating the announcing operation of the radio paging receiver included in the radio paging system illustrated in FIG. 1.

Turning to FIG. 3 with reference to FIGS. 1 and 2 continued, the announcing operation of the announcing arrangement will be summarized. At a first stage S1, the announcing operation is started when the power source switch 14 is turned from the off state to the on state. At a second stage S2 which follows the first stage S1, the control circuit 19 puts the timer circuit 31 in a reset state and makes the timer circuit 31 start a counting operation.

At a third stage S3 which succeeds the second stage S2, judging is carried out in detecting circuit 32 whether or not the synchronizing circuit 21 is in the synchronized state. When the detecting circuit 32 judges that the synchronizing circuit 21 is in the synchronized state, operation proceeds to a fourth stage S4. When the detecting circuit 32 judges that the synchronizing circuit 21 is not in the synchronized state, operation proceeds to a fifth stage S5.

At the fourth stage S4, the detecting circuit 32 produces the detection signal. The detection signal indicates that the synchronizing circuit 32 is in the synchronized state.

At the fifth stage S5, the detecting circuit 32 judges whether or not the timer circuit 31 produces the time-out signal. When the detecting circuit 32 judges that the timer circuit 31 does not produce the time-out signal, operation turns back to the third stage S3. When the detecting circuit 32 judges that the timer circuit 31 produces the time-out signal, operation proceeds to a sixth stage S6.

At the sixth stage S6, the detecting circuit 32 produces the non-detection signal. The non-detection signal indicates that the synchronizing circuit 32 is not in the synchronized state.

At a seventh stage S7 which succeeds the fourth stage S4, the control circuit 19 receives the detection signal and makes the loudspeaker 25 and the LED 27 generate the second tone and the second flicker light the second predetermined time duration. As mentioned above, the second tone and the second flicker light are for announcing the paging receiver 11 is present in the service area 13.

At an eighth stage S8 which follows the sixth stage S6, the control circuit 19 receives the non-detection signal and makes the loudspeaker 25 and the LED 27 generate the third tone and the third flicker light the third predetermined time duration. As described above, the third tone and the third flicker light are for announcing the paging receiver 11 is not present in the service area 13. Thus, the announcing operation comes to an end.

Turning back to FIG. 1, description will proceed to operation of an additional switch 33. It will be assumed that the power source switch 14 is put in the on state and that each of the control circuit 19 and the detecting circuit 32 is therefore supplied with the electric power through the power source switch 14. The additonal switch 33 has an on state and an off state and is connected to the control circuit 19. When the additional switch 33 is manually put in the on state, the additional switch 33 produces an indication instruction signal. Thus, the additional switch 33 serves as a producing unit which manually produces the indication instruction signal.

Figure 4:
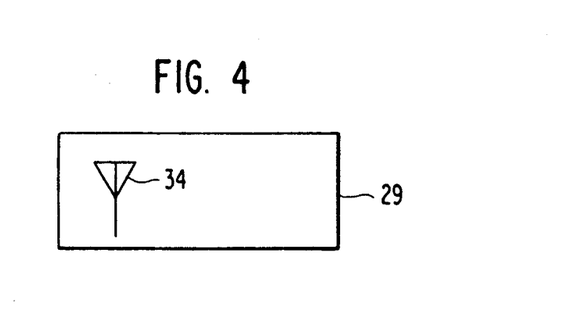
FIG. 4 is an example of a specific symbol which is displayed on a display unit of the radio paging receiver included in the radio paging system illustrated in FIG. 1.

Responsive to the indication instruction signal and to the synchronized clock signal received from the synchronizing circuit 21, the control circuit 19 produces a display drive signal. The control circuit 19 sends the display drive signal to the display unit 29 through the display driver 30 to make the display unit 29 display a specific symbol indicating that the synchronizing circuit 21 of the paging receiver 11 is in the synchronized state. The specific symbol is indicated a fourth predetermined time duration of, for example, two seconds. In FIG. 4, an example of the specific symbol is illustrated at a reference numeral 34. The illustrated specific symbol 34 may indicate an antenna mark.

Thus, in FIG. 1, a combination of the control circuit 19, the display driver 30, and the display unit 29 is operable as an indicating arrangement connected to the synchronizing circuit 21 and the producing arrangement. Responsive to the indication instruction signal and the synchronized clock signal (namely, the synchronized signal), the indicating arrangement indicates that the synchronizing circuit 21 of the paging receiver 11 is in the synchronized state.

Figure 5:
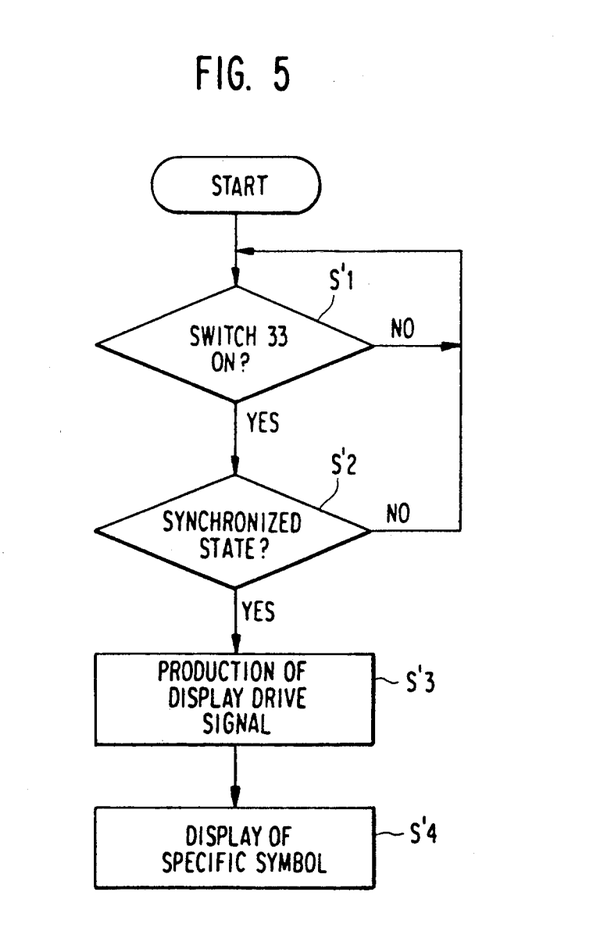
FIG. 5 is another flow chart illustrating the indicating operation of the radio paging receiver included in the radio paging system illustrated in FIG. 1.

Turning to FIG. 5 with reference to FIG. 1 continued, displaying operation of the displaying arrangement will be summarized. At a first stage S'1, judging is carried out in the control circuit 19 whether or not the additional switch 33 is put in the on state (namely, whether or not the additional switch 33 produces the indication instruction signal). The judging is repeatedly carried out until the additional switch 33 is put in the on state.

At a second stage S'2 which follows the first stage S'1, the control circuit 19 judges whether or not the synchronized clock signal is received from the synchronizing circuit 21 (namely, whether or not the synchronizing circuit 21 is in the synchronized state). When the control circuit 19 judges that the synchronizing circuit 21 is the synchronized state, operation proceeds to a third stage S'3. When the control circuit 19 judges that the synchronizing circuit 21 is not the synchronized state, operation returns to the first stage S'1.

At the third stage S'3, the control circuit 19 produces the display drive signal. The third stage S'3 is followed by a fourth stage S'4.

At the fourth stage S'4, the display unit 29 displays, in response to the display drive signal, the specific symbol the fourth predetermined time duration. The specific symbol indicates that the synchronizing circuit 21 of the paging receiver 11 is in the synchronized state.

While this invention has thus far been described in conjunction with a single embodiment thereof, it will readily be possible for those skilled in the art to put this invention into practice in various other manners. For example, it is possible to use the detection signal and the non-detection signal to make the control circuit 19 drive the display unit 29 for display of another specific symbol announcing that the synchronizing circuit 21 of the paging receiver 11 is and is not in the synchronized state (namely, the paging receiver 11 is and is not present in the service area 13), respectively. In FIG. 1, a different detecting circuit may be used instead of the detecting circuit 32. In this case, the different detecting circuit is connected to the switch 14 and the synchronizing circuit 21. The different detecting circuit detects the synchronized signal (namely, the synchronized clock signal) and produces the detection signal when the switch 14 is put in the on state. That is, the different detecting circuit produces the detection signal no matter whether or not the timer circuit 31 produces the time-out signal.

What is claimed is:

1. A radio communication apparatus for receiving radio signals at a predetermined period when supplied with an electric power from a power source, each of said radio signals carrying a synchronization signal and an additional signal succeeding said synchronization signal, said apparatus comprising:

a switch having an on state and an off state and connected to said power source;

first processing means, connected to said switch, for processing each of said radio signals into said synchronization and said additional signals when said switch is put in said on state;

clock generating means, connected to said switch, for generating a timing clock signal when said switch is put in said on state;

synchronizing means, connected to said switch, said first processing means and said clock generating means, for synchronizing said timing clock signal with said synchronization signal so as to produce a synchronized clock signal when said switch is put in said on state; and second processing means, connected to said switch, said first processing means and said synchronizing means, for processing said additional signal into a processed signal by using said synchronized clock signal when said switch is put in said on state;

timer means, connected to said switch, for timing a preselected time interval substantially equal to said predetermined period from a time instant at which said switch is turned from said off state to said on state, said timer means producing a time-out signal when said timer means times said preselected time interval;

detecting means, connected to said switch, said synchronizing means and said timer means, for detecting, when said switch is put in said on state, a time at which said timing clock signal becomes said synchronized clock signal, said detecting means producing a detection signal when said detecting means detects said time before reception of said time-out signal, said detecting means producing, when said detecting means does not detect said time before reception of said time-out signal, said time-out signal as a non-detection signal; and announcing means connected to said switch and said detecting means for announcing, in response to said detection signal and said non-detection signal when said switch is put in said on state, that said apparatus is in one of synchronized state and an unsynchronized state, respectively.

2. A radio communication apparatus for receiving radio signals at a predetermined period when supplied with an electric power from a power source and when put in a service area of a base station, each of said radio signals carrying a synchronization signal and an additional signal succeeding said synchronization signal, said apparatus comprising:

a switch having an on state and an off state and connected to said power source;

first processing means, connected to said switch, for processing each of said radio signals into said synchronization and said additional signals when said switch is put in said on state;

clock generating means, connected to said switch, for generating a timing clock signal when said switch is put in said on state;

synchronizing means, connected to said switch, said first processing means and said clock generating means, for synchronizing said timing clock signal with said synchronization signal so as to produce a synchronized clock signal when said switch is put in said on state; and second processing means connected to said switch, said first processing means and said synchronizing means, for processing said additional signal into a processed signal by using said synchronized clock signal when said switch is put in said on state;

timer means, connected to said switch, for timing a preselected time interval substantially equal to said predetermined period from a time instant at which said switch is turned from said off state to said on state, said timer means producing a time-out signal when said timer means times said preselected time interval;

detecting means, connected to said switch, said synchronizing means and said time means, for detecting, when said switch is put in said on state, a time at which said timing clock signal becomes said synchronized clock signal, said detecting means producing a detection signal when said detecting means detects said time before reception of said time-out signal, said detecting means producing, when said detecting means does not detect said time before reception of said time-out signal, said time-out signal as a non-detection signal; and announcing means connected to said switch and said detecting means for announcing, in response to said detection signal and said non-detection signal, when said switch is put in said on state, that said apparatus is one of present and not present in said service area, respectively.

3. A radio communication apparatus as claimed in claim 1, wherein said apparatus further comprises:

producing means for manually producing an indication instruction signal; and indicating means connected to said switch, said synchronizing means and said producing means, for indicating, in response to both said indication instruction and said synchronized clock signals when said switch is put in said on state, that said apparatus is in said synchronized state.

4. A radio communication apparatus as claimed in claim 2, wherein said apparatus further comprises:

producing means for manually producing an indication instruction signal; and indicating means connected to said switch, said synchronizing means and said producing means for indicating, in response to both said indication instruction and said synchronized clock signals when said switch is put in said on state, that said apparatus is present in said service area.

* * * * *

UNITED STATES PATENT AND TRADEMARK OFFICE
CERTIFICATE OF CORRECTION

PATENT NO.   : 5,148,160
DATED        : September 15, 1992
INVENTOR(S)  : Kazuhiro KUDOH It is certified that error appears in the above-identified patent and that said Letters Patent is hereby corrected as shown below:

Col. 4, line 3, delete "cod" and insert --code--;

Col. 4, line 20, delete "PS" and insert --FS--;

Col. 5, line 17, delete "domodulated" and insert --demodulated--;

Col. 5, line 56, delete "swith" and insert --switch--;

Col. 5, line 66, delete "PS" and insert --FS--;

Col. 6, line 11, delete "sychronized" and insert --synchronized--;

Col. 6, line 14, delete "swith" and insert --switch--;

Signed and Sealed this

Fourteenth Day of December, 1993

Attest:

BRUCE LEHMAN

*Attesting Officer*  *Commissioner of Patents and Trademarks*